United States Patent

Falk et al.

(10) Patent No.: US 9,542,157 B2
(45) Date of Patent: Jan. 10, 2017

(54) RANDOM NUMBER GENERATOR AND METHOD FOR GENERATING RANDOM NUMBERS

(71) Applicants: Rainer Falk, Poing (DE); Steffen Fries, Baldham (DE)

(72) Inventors: Rainer Falk, Poing (DE); Steffen Fries, Baldham (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 14/679,099

(22) Filed: Apr. 6, 2015

(65) Prior Publication Data

US 2015/0293748 A1    Oct. 15, 2015

(30) Foreign Application Priority Data

Apr. 11, 2014  (DE) .................. 10 2014 206 992

(51) Int. Cl.
| | |
|---|---|
| G06F 21/00 | (2013.01) |
| G06F 7/58 | (2006.01) |
| H04L 9/08 | (2006.01) |
| H04L 9/32 | (2006.01) |
| G06F 11/30 | (2006.01) |
| G06F 12/00 | (2006.01) |

(52) U.S. Cl.
CPC .............. G06F 7/582 (2013.01); G06F 7/588 (2013.01); H04L 9/0866 (2013.01); H04L 9/0869 (2013.01); H04L 9/3234 (2013.01)

(58) Field of Classification Search
None
See application file for complete search history.

(56) References Cited

U.S. PATENT DOCUMENTS

| | | | | |
|---|---|---|---|---|
| 6,324,558 | B1 * | 11/2001 | Wilber ................... | G06F 7/588 708/250 |
| 6,745,331 | B1 * | 6/2004 | Silverbrook ............ | G06F 21/31 347/10 |
| 2007/0273408 | A1 * | 11/2007 | Golic ..................... | G06F 7/584 326/93 |

(Continued)

FOREIGN PATENT DOCUMENTS

WO    WO 2012136763 A2    10/2012

OTHER PUBLICATIONS

European Office action for European Application No. 15154590.2-1870, dated Sep. 18, 2015, with English Translation.

(Continued)

*Primary Examiner* — Shin-Hon Chen
(74) *Attorney, Agent, or Firm* — Lempia Summerfield Katz LLC

(57) ABSTRACT

A random number generator for generating random numbers using a solid-state memory is proposed. The random number generator includes a determination unit for determining management data stored in the solid-state memory and for managing the solid-state memory during operation. The random number generator also includes a computing unit for calculating a starting value on the basis of the determined management data. The random number generator also includes a generation unit for generating a random number on the basis of the calculated starting value.

20 Claims, 2 Drawing Sheets

(56) References Cited

U.S. PATENT DOCUMENTS

| | | | | |
|---|---|---|---|---|
| 2008/0263117 | A1* | 10/2008 | Rose | G06F 7/582 708/254 |
| 2009/0161246 | A1 | 6/2009 | Campello De Souza | |
| 2009/0165086 | A1* | 6/2009 | Trichina | G06F 7/588 726/2 |
| 2010/0070549 | A1* | 3/2010 | Nagaraj | G06F 7/588 708/254 |
| 2010/0106756 | A1* | 4/2010 | Ellison | G06F 7/58 708/212 |
| 2011/0085657 | A1* | 4/2011 | Matthews, Jr. | G06F 12/1408 380/28 |
| 2013/0124591 | A1 | 5/2013 | Buch et al. | |
| 2013/0212140 | A1 | 8/2013 | Forehand | |
| 2014/0032935 | A1* | 1/2014 | Kim | G06F 21/6218 713/193 |
| 2014/0068149 | A1* | 3/2014 | Kanamori | G06F 12/0246 711/103 |
| 2014/0146607 | A1* | 5/2014 | Nagai | G06F 7/58 365/185.04 |
| 2015/0095550 | A1* | 4/2015 | Khan | G06F 3/061 711/103 |
| 2015/0193204 | A1* | 7/2015 | Lin | G06F 7/588 708/250 |
| 2015/0268934 | A1* | 9/2015 | Anderson | G06F 7/588 708/250 |

OTHER PUBLICATIONS

M500 2.5-Inch SATA NANO Flash SSD, pp. 1-15, XP055211971, URL:https://www.micron.com/-/media/documents/products/datasheet/ssd/m500 2 5 ssd.pdf, 2015.

Muller T. et al: Self-Encrypting Disks pose Self-Decrypting Risks, How to break Hardware-based Full Disk Encryption, Technical report for the German talk (Un)Sicherheit Hardware-basierter Festplattenver¬schlüsselung, XP055211962, 2012.

German Office Action cited in De 10 2014 206 992.0, mailed Aug. 19, 2014, with English translation.

Random Number Generation, Wikipedia, pp. 1-9, http://en.wikipedia.org/wiki/Random_Number_Generation (2015).

Cryptographically Secure Pseudorandom Number Generator, Wikipedia, pp. 1-6, http://en.wikipedia.org/wiki/Cryptographically_Secure_Pseudorandom (2015).

Hardware random number generator, Wikipedia, pp. 1-10, http://en.wikipedia.org/wiki/Hardware_random_number_generator (2014).

Wang Y. et al: Flash Memory for Ubiquitous Hardware Security Functions: True Random Number Generation and Device Fingerprints, http://tsg.ece.cornell.edu/lib/exe/fetch.php?media=pubs:flash-ieeesp2012.pdf (2012).

Hars L.: Random Number Generators in Secure Disk Drives, pp. 1-10, http://downloads.hindawi.com/journals/es/2009/598246.pdf (2009).

Müller S.: CPU Time Jitter Based Non-Physical True Random Number Generator, pp. 1-147, http://www.chronox.de/jent/doc/CPU-Jitter-NPTRNG.html (2014).

Error Detection/Correction and Bad Block Management, An InnoDisk White Paper, pp. 1-5, Aug. 2012, http://www.contradata.it/cataloghi/InnoDisk_Error_Correction_Detection_and_Bad_Block_Management_White_Paper.pdf.

Wear leveling, Wikipedia, p. 1, http://en.wikipedia.org/wiki/Wear_leveling (2014).

Hofemeier G.: Intel Digital Random Number Generator (DRNG) Software Implementation Guide, pp. 1-15, http://software.intel.com/en-us/articles/intel-digital-random-number-generator-drng-software-implementation-guide (2012).

* cited by examiner

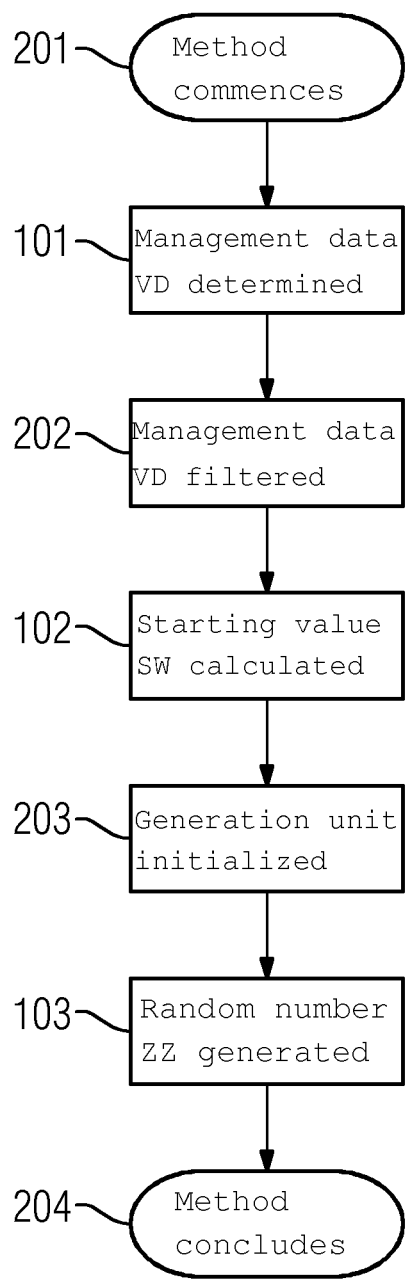

RANDOM NUMBER GENERATOR AND METHOD FOR GENERATING RANDOM NUMBERS

CROSS-REFERENCE TO RELATED APPLICATIONS

This application claims the benefit of DE 10 2014 206 992.0, filed on Apr. 11, 2014, which is hereby incorporated by reference in its entirety.

TECHNICAL FIELD

The embodiments relate to a random number generator for generating random numbers using a solid-state memory. The embodiments also relate to a method for generating random numbers using a solid-state memory.

BACKGROUND

Random numbers form a basis in cryptography, in particular, during key management for security services such as integrity protection and the encryption of data. Random numbers are needed, in particular, to generate a cryptographic key or to determine a nonce. Random numbers may be generated using logical or physical random number generators. Strong random numbers, that is to say particularly randomly selected random numbers, may be generated by or using a physical random number generator. In this case, a pseudorandom number generator may be initialized using a starting value that was determined using a physical random number generator.

Random number generators may be known such as http://de.wikipedia.org/wiki/Zufallszahlengenerator. There are physical random number generators that determine a random number on the basis of a physical effect. Pseudorandom number generators are also known, which, starting from a starting value, determine a sequence of pseudorandom numbers using a deterministic calculation function. These have statistical properties expected of random numbers. Deterministic cryptographic random number generators are provided that likewise calculate a random number sequence deterministically starting from a starting value. The random numbers have special properties required for use in cryptographic protocols, see, inter alia, http://de.wikipedia.org/wiki/Kryptographisch_sicherer_Zufallszahlengenerator. In this case, at least the starting value may be determined using a physical random number generator.

An overview of hardware-based random number generators is provided, for example, by http://en.wikipedia.org/wiki/Hardware_random_number_generator.

A hardware random number generator is implemented on Intel CPUs, for example (see http://software.intel.com/en-us/articles/intel-digital-random-number-generator-drng-softwareimplenentation-guide). In this case, a plurality of computing cores access the same random number generator.

In order to generate random numbers, physical effects such as noise of semiconductor components may be used as the source of random numbers. "Flash Memory for Ubiquitous Hardware Security Functions: True Random Number Generation and Device Fingerprints" (see http://tsg.ece.cornell.edu/lib/exe/fetch.php?media=pubs:flash-ieeesp2012.pdf) discloses the practice of using a flash memory to generate random numbers. In this case, the generation-recombination noise (telegraph noise, RTN) and thermal noise in semiconductor modules are used. In this case, memory cells are erased and are then repeatedly partially written to. A parameter dependent on physical effects may then be determined for memory areas by reading-out.

The practice of initializing a random number generator (RNG) during the system start or else during the runtime on the basis of physical effects is disclosed (see http://downloads.hindawi.com/journals/es/2009/598246.pdf). In this case, use is made, for example, of the fact that the time behavior during the starting of a hard disk is not always exactly the same. This may be determined using a high-speed counter. These variations are used to generate a pool of random numbers.

Another source that is used is the tracking error, for example, which is the deviation of the position of the reading head from the optimum data path on the hard disk during reading. US 2009/0161246 A1 discloses the generation of a random number using an evaluation of the reading head position.

WO 2012/136763 A2 discloses the fact that the memory state of part of the random contents of a flash memory may be used for starting values (e.g., seeds) for initializing a pseudorandom number generator. The random number generator therefore generates random numbers that are in turn used to overwrite the corresponding memory area and may therefore be used as a new source of seeds.

The fact that the temporal variances during read/write access operations are used for hard disks is disclosed, for example (see http://www.chronox.de/jent/doc/CPU-Jitter-NPTRNG.html).

The practice of carrying out bad block management of solid-state disks (SSDs) is disclosed (see http://www.contradata.it/cataloghi/InnoDisk_Error_Correction_Detection_and_Bad_Block_Management_White_Paper.pdf), in which defective blocks are marked and are therefore no longer used to store information. Available memory areas on SSDs may be optimized, for example, by grouping on the basis of degrees of wear of the memory areas (see, for example, http://en.wikipedia.org/wiki/Wear_leveling).

SUMMARY AND DESCRIPTION

The scope of the present invention is defined solely by the appended claims and is not affected to any degree by the statements within this summary. The present embodiments may obviate one or more of the drawbacks or limitations in the related art.

Against this background, an object of the present embodiments is to make it possible to generate strong random numbers on the basis of a physical source in a simple manner.

Accordingly, a random number generator for generating random numbers using a solid-state memory is proposed. The random number generator has a determination unit for determining management data that are stored in the solid-state memory for managing the solid-state memory during operation. The random number generator also has a computing unit for calculating a starting value on the basis of the determined management data. The random number generator also has a generation unit for generating a random number on the basis of the calculated starting value.

The respective unit, (e.g., the computing unit or generation unit), may be implemented using hardware and/or else software. In the case of an implementation using hardware, the respective unit may be in the form of an apparatus or part of an apparatus, for example, in the form of a computer or microprocessor. In the case of an implementation using software, the respective unit may be in the form of a computer program product, a function, a routine, part of a program code, or an executable object.

The idea of the proposed random number generator is based on providing random numbers for systems using a solid-state memory in a simple manner. In this case, already existing information from the memory management of the solid-state memory is used and no additional information is generated. In this case, differences between different solid-state memories lie in physically caused production tolerances and the thus initial status of a memory management and the different use. This results in different load data, that is to say data associated with the use, (e.g., the number of read/write access operations), and therefore different management data. This also provides the randomness for solid-state memories of the same type. The management data may be generated during production, for example, in order to mark defective memory cells, and/or may be created and/or updated during use, for example, in order to mark memory cells that have become defective during use or in order to update use-dependent information relating to memory cells.

The management data that are generated by the solid-state memory during the lifetime of the solid-state memory, that is to say during production and/or during operation, are used to generate random numbers using the solid-state memory. A starting value or an initialization value for a deterministic random number generation unit (called generation unit below) is determined from the management data needed to handle physical restrictions and defects of the physical memory, which generation unit then generates a random number. This has the advantage that physical defects of individual memory cells that may not be specifically predicted, for example, are included as a physical entropy, that is to say randomness. In addition, use-dependent effects may also be included, with the result that different random data are provided after a repeated system start, for example, even if no new physical defects have occurred in the meantime. In this case, the fact that memory cells may already be defective or may develop a defect during use is used as an effect to physically generate random numbers. The fact that special information is acquired and stored anyway in order to handle defective memory cells or to provide uniform use of the solid-state memory and therefore of memory cells and to avoid excessive, impermissible loading of memory cells is used in this case in order to determine an item of information for determining a physical random number with a small amount of additional effort.

In this context, a solid-state memory refers to, for example, an electronic storage medium that is implemented by semiconductor modules. The solid-state memory is a non-volatile memory.

According to one embodiment, the computing unit is configured to initialize the generation unit on the basis of the calculated starting value. For this purpose, the management data may be used directly, for example, or a hash value of the management data may be used.

In this embodiment, the starting value is used as an initialization value. The generation unit is initialized on the basis of the value. In other words, the generation unit uses this value to carry out its calculation for generating a random number.

According to another embodiment, the management data have information relating to memory areas of the solid-state memory.

The information may relate to the current state (so-called health parameters) of the individual memory cells or memory areas of the solid-state memory and tables that indicate that physical memory cells may no longer be used.

According to another embodiment, the information has a degree of wear, a counter of read and/or write access operations, and/or information relating to a shift of logical memory blocks to physical memory blocks.

Since a solid-state memory uses relatively unreliable memory cells with a limited number of writing cycles, degree of wear algorithms, (so-called wear leveling algorithms), may be used in order to achieve uniform loading of the memory cells by write access operations, on the one hand, and to exclude defective memory cells or memory areas for further use, on the other hand. In this case, it is possible for individual memory cells to already be defective during production. In this case, the solid-state memory may carry out memory management that, in addition to the pure memory management known from conventional file systems, (that is to say which data are stored where), also collects information from self-tests and contains data relating to the memory cell quality. This information or these data relate(s), for example, to which cell has been written to how often or which cell may no longer be used. Depending on the quality of the memory cells, outwardly static logical memory blocks may be internally represented by different physical memory blocks.

The memory management may use the degree of use or the degree of wear (e.g., wear level) of a memory cell, for example, to determine whether a memory cell will (soon) fail and may then copy the data to another physical cell in order to avoid loss of data. This monitoring of the memory cells is continuously carried out in solid-state memories in order to provide the most uniform possible loading of the memory cells of the entire solid-state memory. Since these data are dependent on variances during production and also on the use of the solid-state memory, the management data are specific to the respective solid-state memory and may therefore be used to generate random numbers by the random number generator described herein.

In addition to the degree of wear (e.g., wear level (WL)), the information may have the counter of the read/write access operations (CLS) for the entire solid-state memory or for a memory block or a memory cell and information relating to the shift of logical memory blocks to physical memory blocks. This information may then be transformed by the computing unit into one or more starting values (e.g., seeds) S for the generation unit using a computing function, for example, a hash function:

$S = H(MSSD\{\|WL\}\{\|CLS\})$

In this case, { . . . } denotes optional variants, and ∥ denotes the concatenation. MSSD denotes the management data relating to the solid-state memory.

According to another embodiment, the computing unit is configured to calculate the starting value using a cryptographic hash function.

SHA-1, SHA256, SHA384, SHA 512, SHA-3, H-PRESENT-128, for example, may be used as cryptographic hash functions here. The cryptographic hash function may also be, for example, in the form of a keyed hash function, (e.g., HMAC-SHA1, HMAC-SHA256, HMAC-SHA384, HMAC-SHA512, HMAC-SHA3, AES-CBCMAC, AES-GMAC).

According to another embodiment, the computing unit is configured to calculate the starting value using a symmetrical algorithm.

The symmetrical algorithm may be used, for example, as an MAC algorithm (Message Authentication Code). One example of this is AES-CBCMAC.

According to another embodiment, the computing unit is configured to calculate the starting value on the basis of the management data and at least one property of the solid-state memory.

According to this embodiment, in addition to the management data relating to the solid-state memory, further information for generating a starting value or a seed may also be concomitantly included. Examples of this information are access times (Z) for memory cells. These may also vary, for example, as a result of the different physical representation of a logical data block.

Accordingly, the starting value may be determined by:
S=H(MSSD){||WL}{||CLS}{||Z}).

According to another embodiment, the computing unit is configured to calculate the starting value on the basis of the management data and a key, the key being determined by at least one property of the solid-state memory.

One or more properties of the solid-state memory may be used as keys for the hash function or the symmetrical algorithm. These properties may be properties that are set or predefined when producing the solid-state memory. Such a property may be the serial number of the solid-state memory.

According to another embodiment, the at least one property has access times to memory cells of the solid-state memory and/or device-specific parameters.

The at least one property may be device-specific parameters such as the serial number of the device, that is to say of the solid-state memory, or data such as the model, production data, etc., which may be included in the random number generation as input parameters. Although these data are not random, they result in a plurality of specimens of a device generating different random numbers even if the management data may initially be identical or at least similar, that is to say after production or delivery.

According to another embodiment, the determination unit is configured to receive the management data from a controller.

The controller may be any type of control unit that is able to manage the solid-state memory or access the management data.

According to another embodiment, the controller is arranged internally in the solid-state memory and is configured to manage the management data.

The solid-state memory may have the controller. The random number generator may likewise be included inside the solid-state memory. In this case, the computing unit, the determination unit, the generation unit, and the controller may be in the form of a single integral unit.

According to another embodiment, the controller is configured to control access to the solid-state memory on the basis of the generated random number.

The generated random number or the starting value or the raw data for determining the starting value may be used internally by the solid-state memory. For example, access to the data in the solid-state memory or a write confirmation command may be delayed on the basis of the random value. In another embodiment, the generated random number may be provided to the outside via an interface. As a result, a computer that accesses the solid-state memory, for example, may be provided with a random value.

According to another embodiment, the controller is configured to generate a key for encrypting or decrypting data stored in the solid-state memory on the basis of the generated random number.

The solid-state memory may use the controller to determine an encryption key for hard disk encryption. This encryption key may be determined by the generated random number.

According to another embodiment, the solid-state memory has a solid-state disk, an SD card, a USB storage device, and/or a flash memory module.

The solid-state memory may be used for any type of semiconductor module memory.

Another aspect proposes a method for generating random numbers using a solid-state memory. The method includes the following acts of: (1) determining management data that are stored in the solid-state memory for managing the solid-state memory during operation, (2) calculating a starting value on the basis of the determined management data, and (3) generating a random number on the basis of the calculated starting value.

A computer program product that causes the method explained above to be carried out on a program-controlled device is also proposed.

A computer program product such as a computer program may be provided or supplied as a storage medium, such as a memory card, USB stick, CD-ROM, DVD, or else in the form of a downloadable file from a server in a network, for example. This may be effected in a wireless communication network, for example, by transmitting an appropriate file with the computer program product or the computer program.

The embodiments and features described for the proposed apparatus accordingly apply to the proposed method.

Further possible implementations also include combinations that are not explicitly mentioned for features or embodiments that are described above or below for the exemplary embodiments. In this case, a person skilled in the art will also add single aspects as improvements or additions.

BRIEF DESCRIPTION OF THE DRAWINGS

FIG. 3 depicts a schematic flowchart of a second exemplary embodiment of a method for generating a key.

In the figures, identical or functionally identical elements have been provided with the same reference symbols, unless indicated otherwise.

DETAILED DESCRIPTION

Figure 1:
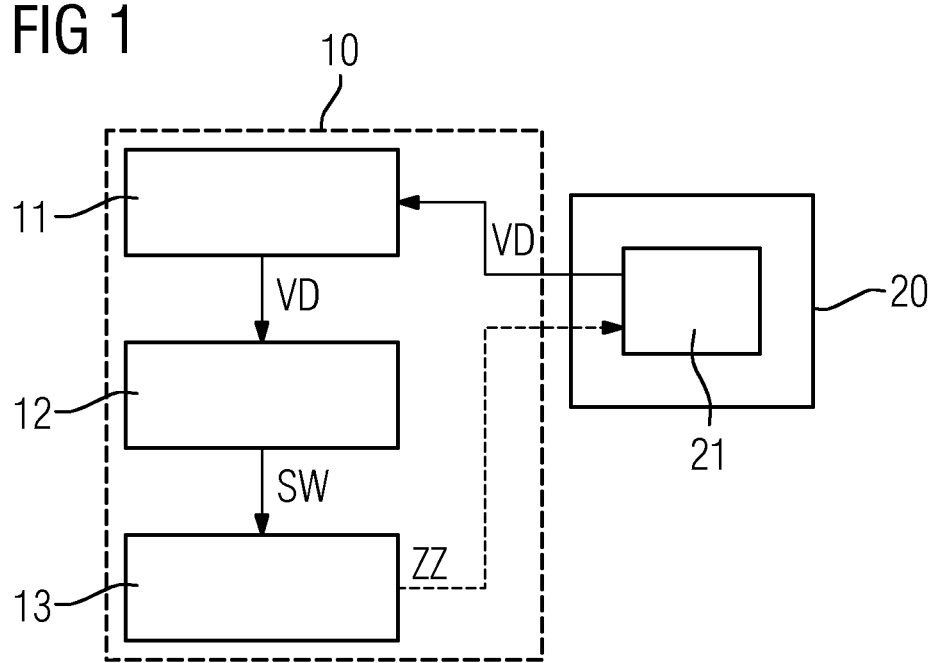
FIG. 1 depicts a schematic block diagram of an exemplary embodiment of a random number generator.

FIG. 1 depicts an exemplary embodiment of a random number generator 10.

The random number generator 10 has a determination unit 11, a computing unit 12, and a generation unit 13.

The determination unit 11 is configured to determine management data VD. The management data VD are stored in a solid-state memory 20 for managing the solid-state memory 20. Management data VD are continuously generated and stored during the service life of the solid-state memory 20. These management data contain, inter alia, information relating to the current state of the individual memory cells or memory areas of the solid-state memory 20 and tables indicating that physical memory cells may no longer be used.

The determination unit 11 may receive these management data from a controller 21 of the solid-state memory 20, for example. In another variant, the determination unit 11 may independently determine management data VD. It may read these management data, for example, directly from a memory area that is intended to store the management data VD.

The computing unit 12 receives the determined management data VD from the determination unit 11. The computing unit 12 calculates a starting value SW on the basis of the determined management data VD.

A generation unit 13 then generates a random number ZZ on the basis of this starting value SW. In this case, the generation unit 13 may be initialized on the basis of the starting value SW. A pseudorandom number generator, for example, may be used for this purpose.

The random number ZZ may be forwarded to the controller 21. The controller 21 may use the random number ZZ to encrypt or decrypt memory areas of the solid-state memory 20 or may forward the random number ZZ to external apparatuses.

Although the random number generator 10 is depicted as a separate apparatus in FIG. 1, the random number generator 10 may also be arranged in the solid-state memory 20.

Figure 2:
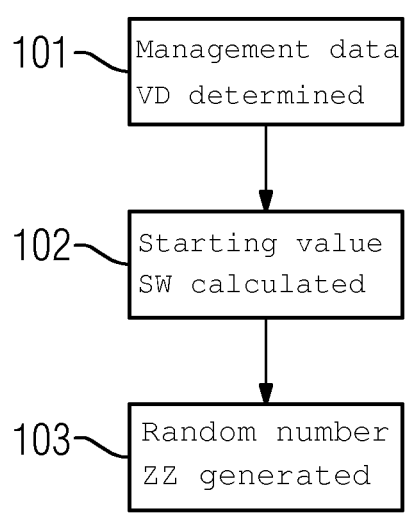
FIG. 2 depicts a schematic flowchart of a first exemplary embodiment of a method for generating a key.

FIG. 2 depicts a first exemplary embodiment of a method for generating random numbers ZZ using a solid-state memory 20.

In act 101, management data VD are determined, which management data are stored in the solid-state memory 20 for managing the solid-state memory 20 during operation.

In act 102, a starting value SW is calculated on the basis of the determined management data VD.

In act 103, a random number ZZ is then generated on the basis of the calculated starting value SW.

FIG. 3 depicts a second exemplary embodiment of a method for generating random numbers ZZ using a solid-state memory 20.

The method depicted in FIG. 3 includes further acts in addition to acts 101 to 103 from FIG. 2.

The method is started in act 201.

The management data VD are determined in act 101.

In act 202, the management data VD are filtered in order to obtain the information that is intended to be used to calculate the starting value SW in the further method. This information includes, for example, the wear level or memory block shifts.

In act 102, the starting value SW is calculated on the basis of the (e.g., filtered) management data VD. A one-way function may be used for this purpose.

In act 203, the generation unit 13 is initialized on the basis of the calculated starting value SW.

The random number ZZ is then calculated in act 103 and the method is ended in act 204.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A random number generator for generating random numbers, the random number generator comprising:
   at least one microprocessor; and
   a solid-state memory configured to, with the at least one microprocessor, cause the random number generator to at least perform:
      determine management data stored in the solid-state memory and manage the solid-state memory during operation such that at least one defective memory cell of the solid-state memory is marked;
      calculate a starting value using the at least one marked defective memory cell of the determined management data; and
      generate a random number using the calculated starting value.

2. The random number generator as claimed in claim 1, wherein the management data comprise information relating to memory areas of the solid-state memory.

3. The random number generator as claimed in claim 2, wherein the information comprises one or more of the following: (1) a degree of wear, (2) a counter of read, write, or read and write access operations, or (3) information relating to a shift of logical memory blocks to physical memory blocks.

4. The random number generator as claimed in claim 1, wherein the starting value is calculated using a cryptographic hash function.

5. The random number generator as claimed in claim 1, wherein the starting value is calculated using a symmetrical algorithm.

6. The random number generator as claimed in claim 1, wherein the starting value is calculated using the management data and at least one property of the solid-state memory.

7. The random number generator as claimed in claim 6, wherein the at least one property comprises device-specific parameters, access times to memory cells of the solid-state memory, or both the device-specific parameters and the access times to the memory cells of the solid-state memory.

8. The random number generator as claimed in claim 7, wherein the device-specific parameters comprise a serial number of the solid-state memory.

9. The random number generator as claimed in claim 1, wherein the starting value is calculated using the management data and a key, the key being determined by at least one property of the solid-state memory.

10. The random number generator as claimed in claim 1, wherein the solid-state memory, with the at least one microprocessor, cause the random number generator to further perform:
    receive the management data from a controller.

11. The random number generator as claimed in claim 10, wherein the controller is arranged internally in the solid-state memory and is configured to manage the management data.

12. The random number generator as claimed in claim 11, wherein the controller is configured to control access to the solid-state memory using the generated random number.

13. The random number generator as claimed in claim 12, wherein the controller is configured to generate a key for encrypting or decrypting data stored in the solid-state memory using the generated random number.

14. The random number generator as claimed in claim 11, wherein the controller is configured to generate a key for encrypting or decrypting data stored in the solid-state memory using the generated random number.

15. The random number generator as claimed in claim 1, wherein the solid-state memory comprises a solid-state disk, an SD card, a USB storage device, a flash memory module, or a combination thereof.

16. The random number generator as claimed in claim 1, wherein the at least one defective memory cell is formed during production of the solid-state memory.

17. The random number generator as claimed in claim 1, wherein the at least one defective memory cell is formed during use of the solid-state memory.

18. A method for generating random numbers using a solid-state memory, the method comprising:
   determining, by a microprocessor, management data stored in the solid-state memory for managing the solid-state memory during operation, wherein at least one defective memory cell of the solid-state memory is marked;
   calculating, by the microprocessor, a starting value using the at least one marked defective memory cell of the determined management data; and
   generating, by the microprocessor, a random number using the calculated starting value.

19. The method as claimed in claim 18, wherein the at least one defective memory cell is formed during production of the solid-state memory.

20. The method as claimed in claim 18, wherein the at least one defective memory cell is formed during use of the solid-state memory.

* * * * *